UNITED STATES PATENT OFFICE.

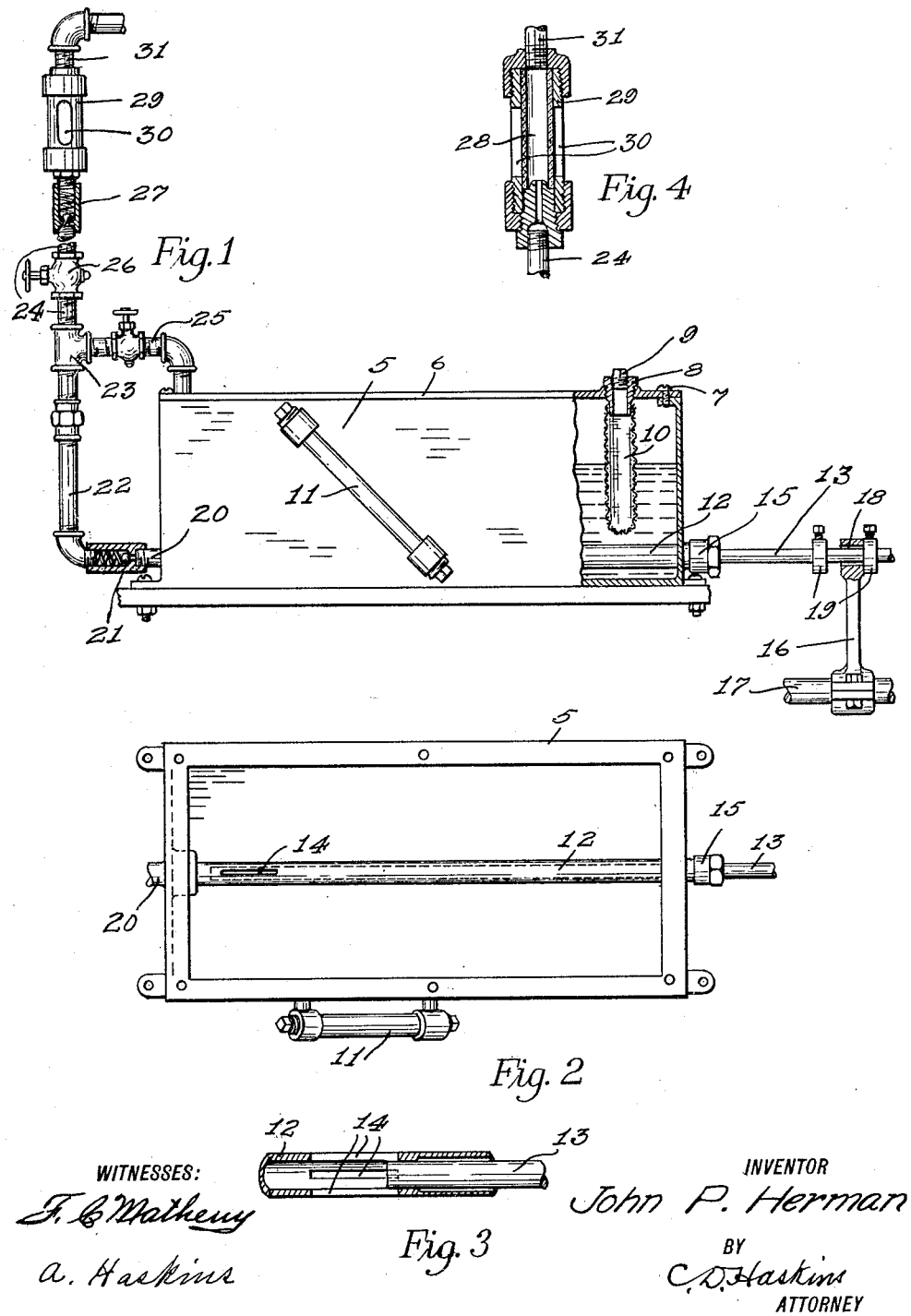

JOHN P. HERMAN, OF EDMONDS, WASHINGTON.

LUBRICATOR-PUMP.

1,136,334.   Specification of Letters Patent.   Patented Apr. 20, 1915.

Application filed January 17, 1914. Serial No. 812,639.

*To all whom it may concern:*

Be it known that I, JOHN P. HERMAN, citizen of the United States, residing at Edmonds, in the county of Snohomish and State of Washington, have invented a certain new and useful Improvement in Lubricator-Pumps, of which the following is a specification.

My invention relates to improvements in lubricator pumps such as are serviceable for injecting oil into the cylinders of different kinds engines, and the object of my improvement is to provide a simple and efficient lubricating device that may be readily attached to any common form of steam engine or to any internal combustion engine to inject lubricating oil into the cylinder thereof at a rate properly to lubricate its piston and valves. I accomplish this object by devices illustrated in the accompanying drawings in which—

Figure 1 is a view in side elevation of a device embodying my invention, certain parts being broken away better to illustrate certain other parts; Fig. 2 is a plan view of the oil chamber and pumping device of the same with its cover removed; Fig. 3 is a sectional view of a fragment of the oil pump and Fig. 4 is a sectional view of a detail of my invention.

Referring to the drawings throughout which like reference numerals indicate like parts, 5 is a casing that has a cover 6 secured to the top side thereof by screws 7 and is adapted to form an oil chamber in which may be stored lubricating fluid that is to be injected into the cylinder or valves of an engine.

To provide an inlet opening through which oil may be introduced into the chamber 5, the cover 6 is formed with a suitable hole into which a ring or collar 8 may be screwed, which collar 8 is in turn adapted to have a plug 9 screwed into it normally to close the inlet opening and to have a closely meshed screen 10 of a cylindrical form secured to the lower portion thereof, such screen 10 being closed at its bottom end to form a strainer through which fluid for the chamber 5 must pass in order that no large sized particles of foreign matter may be introduced with the lubricating fluid to clog the pump or to find their way into the cylinder and valves of the engine.

A glass gage 11 is preferably provided on one side of the casing 5 to indicate the amount of oil contained at any time in such casing 5. A hollow cylindrical tube 12 is provided within the casing 5 and is adapted to extend lengthwise along the bottom thereof, such tube 12 being adapted to have a piston 13 reciprocate within its bore and being provided with a plurality of openings or slots 14, 14 disposed near the end of the travel of the piston 13 through which oil may be admitted from the oil chamber to the tube 12. The piston 13 extends outwardly through a suitable stuffing box 15 provided on one end of the casing 5 and is connected with suitable mechanism whereby reciprocating motion may be imparted thereto such mechanism preferably consisting in a connecting arm 16 that may have one end secured to an adjacent reciprocating shaft 17, as the piston-rod or valve-rod of an engine, and which may have provided in its other end a hole 18 of relatively large diameter through which the piston 13 may extend, such piston 13 being adjustably connected with the connecting arm 16 by collars 19, 19 that are secured thereon on each side of such connecting arm 16, as clearly shown in Fig. 1, the large hole 18 permitting a slight automatic adjustment of the piston 13 whereby it may not be caused to bind in the stuffing box 15. The other end of the tube 12 that is distant from the stuffing box 15 is connected with an outlet pipe 20 which is provided with a suitable ball check-valve 21, which outlet pipe 20 is connected with another pipe 22 that is connected by a T fitting 23 with a vertical pipe 24 and a horizontal pipe 25, the vertical pipe 24 being provided with a shut off valve 26 and a check-valve 27 and having a glass gage 28 provided on its upper end, as more clearly illustrated in Fig. 4; such glass gage being disposed within a metal casing 29 that is provided with openings 30, 30 through which oil within the gage may be seen, said casing 29 being connected by a pipe 31 with the cylinder or valves of an engine into which lubricating fluid is to be injected. The horizontal pipe 25 communicates with the top portion of the casing 5 and is provided with a shut off valve that may be opened when it is desired to drain the oil in the pipe 24 back into the oil chamber of casing 5.

In order to operate my lubricating device, oil is placed in the oil chamber of casing 5 and the various parts are connected in the manner shown in Fig. 1. As the shaft 17 reciprocates in an endwise direction it causes the piston 13 to reciprocate within the tubular casing 12, the end of such piston 13 fitting snugly within the bore of the tube 12 and thus moving backward and forward within that portion of the tube 12 in which are the slots 14, 14 whereby the oil that may surround said tube may be caused to flow into said tube when the piston rod 13 is withdrawn into the position shown in the detail of Fig. 3 and may be forced outwardly through the pipe 20 and past the ball check-valve 21 when the piston 13 is moved forwardly into the position illustrated by broken lines in Fig. 2, such oil being then forced upwardly through the pipes 22 and 24 into the glass gage 28 and thence passing through the pipe 31 into the cylinder or valve into which oil is to be injected.

When the piston 13 begins its forward movement the slots 14, 14 are fully open and permit a portion of the oil in the tube 12 to flow outwardly therethrough but as such piston 13 moves forwardly it gradually closes said slots thus permitting a gradually decreasing volume of oil to flow outwardly therethrough and at the same time gradually increases the pressure of the oil within the tube 12 until such piston 13 shall have moved forward far enough to entirely close such slots, whereupon the pressure of the oil within the tube 12 will have opened the check-valve 21 and further forward movement of the piston 13 will result in oil being forced outwardly past such check valve 21, the peculiar shape of the long narrow slots 14, 14 thus producing cushioning effects and causing the pressure within the tube 12 to increase gradually upon the forward stroke of the piston 13 thus preventing any sudden shock or pounding that might otherwise occur. If it be desired to regulate the length of stroke of the piston 13 in order to regulate the amount of oil that may be delivered, this may be done in an obvious manner by moving farther apart or closer together the collars 18, 18 that engage with the arm 16 to move such piston 13.

Manifestly numerous changes in form of construction and arrangement of the various parts of my device may be resorted to without departing from the spirit of my invention or sacrificing any of its advantages.

What I claim is:

1. In a lubricating pump, a receptacle, a tube arranged adjacent the bottom thereof, a distributing pipe connected to one end of said tube, an elongated piston within said tube, a plurality of diametrical slots in said tube extending through a substantial portion of the piston stroke within said tube adapted to provide a gradual increase in pressure in the tube, and to permit the oil to gradually escape through said slots until the same are closed by the piston.

2. In a lubricating pump, a receptacle, a tube arranged adjacent the bottom thereof, a distributing pipe connected to one end of said tube, a piston in said tube, and slots in said tube adjacent the extreme movement of the piston in one direction to afford a gradual increase in pressure in said tube when the piston moves in a forward direction, thereby to permit the oil to gradually escape through said slots until the same are closed by the piston.

In witness whereof, I, hereunto subscribe my name this twelfth day of January A. D., 1914.

JOHN P. HERMAN

Witnesses:
E. M. Cox,
Frank Warren.

Copies of this patent may be obtained for five cents each, by addressing the "Commissioner of Patents, Washington, D. C."